United States Patent
Handa et al.

(10) Patent No.: US 9,971,019 B2
(45) Date of Patent: May 15, 2018

(54) SYSTEM AND METHOD FOR THROUGH-THE-WALL-RADAR-IMAGING USING TOTAL-VARIATION DENOISING

(71) Applicant: Mitsubishi Electric Research Laboratories, Inc., Cambridge, MA (US)

(72) Inventors: Hiroyuki Handa, Kanagawa (JP); Hassan Mansour, Boston, MA (US); Dehong Liu, Lexington, MA (US); Ulugbek Kamilov, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 459 days.

(21) Appl. No.: 14/831,057

(22) Filed: Aug. 20, 2015

(65) Prior Publication Data

US 2015/0355314 A1 Dec. 10, 2015

Related U.S. Application Data

(63) Continuation-in-part of application No. 13/947,426, filed on Jul. 22, 2013, now Pat. No. 9,335,408.

(51) Int. Cl.
*G01S 13/89* (2006.01)
*G01S 7/292* (2006.01)
(Continued)

(52) U.S. Cl.
CPC ............... *G01S 7/292* (2013.01); *G01S 3/74* (2013.01); *G01S 13/003* (2013.01); *G01S 13/888* (2013.01); *G01S 13/89* (2013.01)

(58) Field of Classification Search
CPC ...... G01S 13/003; G01S 13/888; G01S 13/89; G01S 3/74; G01S 7/292
(Continued)

(56) References Cited

U.S. PATENT DOCUMENTS 7,834,795 B1  11/2010  Dudgeon et al.
7,898,468 B2  3/2011  Samaniego et al.
(Continued)

OTHER PUBLICATIONS

L. C. Potter, E. Ertin, J. T. Parker, and Cetin, "Sparsity and compressed sensing in radar imaging," Proceedings of the IEEE, vol. 98, No. 6, pp. 1006-1020, Jun. 2010.
(Continued)

*Primary Examiner* — Timothy A Brainard
(74) *Attorney, Agent, or Firm* — Gene Vinokur; James McAleenan; Hinonori Tsukamoto

(57) ABSTRACT

A system and method determines a noise free image of a scene located behind a wall. A transmit antenna emits a radar pulse from different locations in front of the wall, wherein the radar pulses propagate through the wall and are reflected by the scene as echoes. A set of stationary receive antennas acquire the echoes corresponding to each pulse transmitted from each different location. A radar imaging subsystem connected to the transmit antenna and the set of receive antennas determines a noisy image of the scene for each location of the transmit antenna. A total variation denoiser denoises each noisy image to produce a corresponding denoised image. A combiner combines incoherently the denoised images to produce the noise free image.

11 Claims, 3 Drawing Sheets

(51) Int. Cl.
*G01S 3/74* (2006.01)
*G01S 13/88* (2006.01)
*G01S 13/00* (2006.01)

(58) Field of Classification Search
USPC .......................................................... 342/22
See application file for complete search history.

(56) References Cited

U.S. PATENT DOCUMENTS

| | | |
|---|---|---|
| 8,212,710 B2 | 7/2012 | Samaniego |
| 8,570,208 B2 | 10/2013 | Sarkis |
| 2016/0061938 A1* | 3/2016 | Hyman ................... G01S 7/414 342/159 |

OTHER PUBLICATIONS

D. Malioutov, M. Cetin, and A.S. Willsky, "A sparse signal reconstruction perspective for source localization with sensor arrays," IEEE Transactions on Signal Processing, vol. 53, No. 8, pp. 3010-3022, 2005.

L. Li and J.L. Krolik, "Vehicular MIMO SAR imaging in multipath environments," in IEEE Radar Conference (RADAR), 2011, pp. 989-994.

P.P. Vaidyanathan and P. Pal, "Sparse sensing with co-prime samplers and arrays," IEEE Transactions on Signal Processing, vol. 59, No. 2, pp. 573-586, 2011.

P. Pal and P. P. Vaidyanathan, "Nested arrays: a novel approach to array processing with enhanced degrees of freedom," IEEE Trans. Sig. Proc., vol. 58, No. 8, pp. 4167-4181, Aug. 2010.

T. Blumensath and M. E Davies, "Iterative thresholding for sparse approximations," Journal of Fourier Analysis and Applications, vol. 14, No. 5-6, pp. 629-654, 2008.

F. Soldovieri and R. Solimene, "Through-wall imaging via a linear inverse scattering algorithm," IEEE Geoscience and Remote Sensing Letters, vol. 4, No. 4, pp. 513-517, 2007.

W. Zhang and A. Hoorfar, "Two-dimensional diffraction tomographic algorithm for through-the-wall radar imaging," Progress in Electromagnetics Research B, vol. 31, pp. 205-218, 2011.

P. Protiva, J. Mrkvica, and J. Machac, "Estimation of wall parameters from time-delay-only through-wall radar measurements," IEEE Transactions on Antennas and Propagation, vol. 59, No. 11, pp. 4268-4278, 2011.

Mansour et al. "Blind Multi-path Elimination by Sparse Inversion in Through-the-Wall-Imaging," IEEE International Workshop on Computational Advances in Multi-Sensor Adaptive Processing. Dec. 1, 2013.

* cited by examiner

SYSTEM AND METHOD FOR THROUGH-THE-WALL-RADAR-IMAGING USING TOTAL-VARIATION DENOISING

RELATED APPLICATION

This application is a Continuation-in-Part application of U.S. Patent Publication No. 20150022390, "Method and System for Through-the-Wall Imaging using Sparse Inversion for Blind Multi-Path Elimination," Mansour, Jul. 22, 2013, incorporated herein by reference. That application describes a method for detecting a target in a scene behind a wall based on multi-path elimination by sparse inversion (MESI).

FIELD OF THE INVENTION

This invention relates generally to through-the-wall imaging (TWI), and more particularly to denoising images using MIMO antenna arrays and compressive sensing to reconstruct a scene behind a wall.

BACKGROUND OF THE INVENTION

Through-the-wall-imaging (TWI) can be used to detect objects in a scene behind a wall. That is, the objects are positioned inside a structure enclosed by walls are detected from outside the structure. In a typical application, one or more transmit antennas emit radar pulses. The radar pulses propagate through the wall, are reflected by the object as echoes. The echoes are acquired by one or more receive antennas. The echoes are then processed using a radar imaging system or methods to generate a radar image represents positions and reflectivities of the objects.

However, depending on the dielectric permittivity and permeability of the walls, the echoes are often corrupted by indirect secondary reflections from the walls, which result in ghost artifacts that cause a noisy reconstructed image. Denoising the image can significantly improve the quality of TWI.

SUMMARY OF THE INVENTION

The embodiments of this invention describe a system and method that combines noisy images of a scene behind a wall to produce a noise free image. Typically, it is assumed that the scene includes reflectors, such as objects, e.g., people.

The system includes a transmit antenna that emits a radar pulse from different locations in front of the wall. The radar pulses propagate through the wall and are reflected by the scene as echoes. A set of stationary receive antennas acquires the echoes corresponding to each pulse transmitted from each different location.

A radar imaging system connected to the transmit antenna and the set of receive antennas, e.g., via a controller, determines a single-input multiple-output (SIMO) noisy image of the scene for each location of the transmit antenna 110. A total variation denoiser denoises each noisy SIMO image to produce a denoised image. Then, a combiner combines incoherently the denoised images to produce a corresponding noise free image.

One embodiment of the invention incorporates spatial correlation of extended object reflections for object detection based on multipath elimination by a sparse inversion (MESI) method, which models denoising as a structured blind deconvolution problem with sparsity constraints on the scene and multipath reflections. This improves the denoising by ensuring that a separate convolution kernel is determined for each detected object to match the corresponding multi-path reflections.

DETAILED DESCRIPTION OF THE PREFERRED EMBODIMENTS

System Setup

Figure 1:
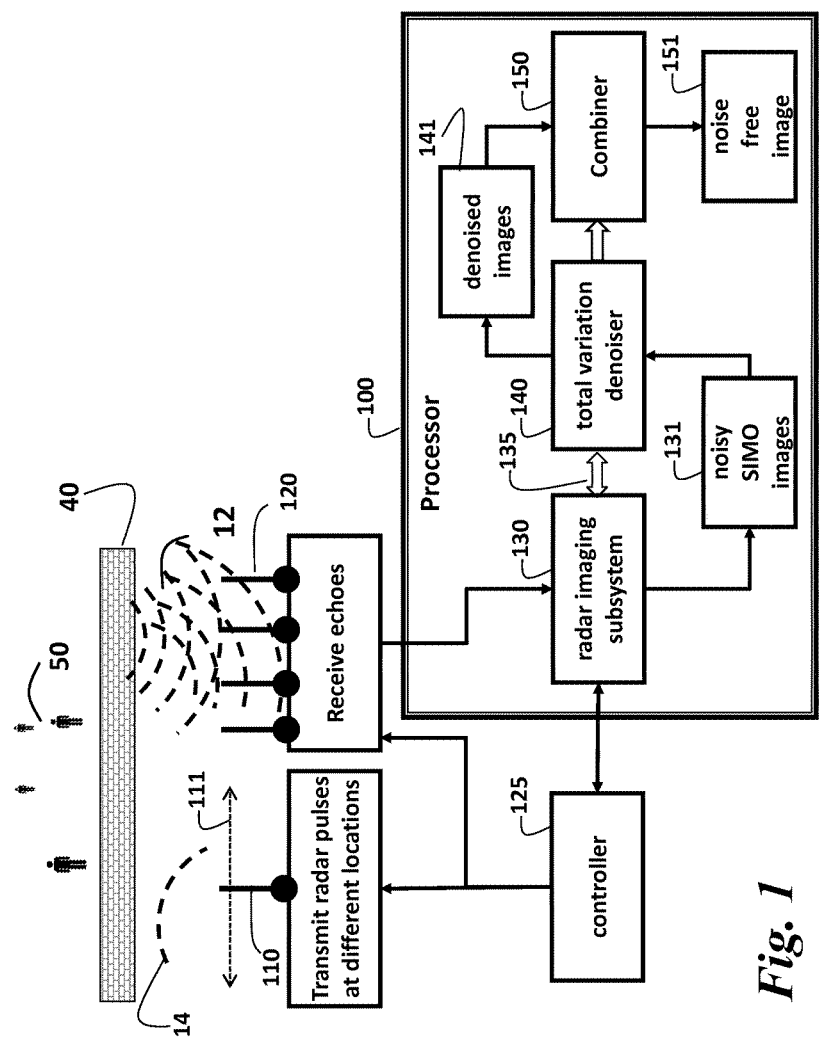
FIG. 1 is a schematic of a system and method for determining a noise free image of a scene behind a wall according to embodiments of the invention.

As shown in FIG. 1, the embodiments of our invention describe a system and method for determining a noise free image of a scene located behind a wall 40. Typically, the scene includes reflectors, such as objects, e.g., people 50. Details of the system setup, the scene and the effect of the wall are described in the related application, U.S. Publication No. 20150022390, "Method and System for Through-the-Wall Imaging using Sparse Inversion for Blind Multi-Path Elimination," Mansour, Jul. 22, 2013, incorporated herein by reference.

The system includes a transmit antenna 110 that emits a radar pulse 14 from different locations 111 in front of the wall 40. The radar pulses propagate through the wall and are reflected as echoes 12. Typically, the reflectors are objects 50, such as people. However, it is understood that invention can be applied to any type of behind the wall scene. A set of stationary receive antennas 120 acquire the echoes 12 that corresponding to each pulse transmitted from each different location.

A radar imaging subsystem 130 is connected to the transmit antenna and the set of receive antennas, e.g., via a controller 125, determines a noisy (single-input multiple-output (SIMO)) image 131 of the scene for each location of the transmit antenna. The controller 125 can be used to synchronize an operations of a transmitter and a receiver and the rest of the system.

A total variation denoiser 140 denoises each noisy image 131 to produce a corresponding denoised image 141. The determining of the images 131 and the producing of the images 131 are repeated 135 for the different locations.

Then, a combiner 150 combines, e.g., sums coherently or incoherently the denoised images 141 to produce the noise free image 151.

The subsystem, denoiser and combiner can be implemented in one or more processors connected to memory and input/output interfaces as known in the art. Alternatively, these can be implemented as discrete components or hardware circuits.

In one embodiment, the transit antenna is one of the antenna 120 operating in transmit mode, and a different antenna is selected for each different location from which to emit the radar pulse 14. After the pulse is emitted, the antenna can be switched back to receiver mode.

Signal Model

For a monostatic (where transmit and receive antennas are collocated) physical aperture radar system shown in FIG. 1, with a single transmit antenna 110 and a set of $n_r$ receive antennas 120, a time-domain waveform is s. When there are K objects 50 in the scene, the time domain primary impulse response (echo) of an object indexed by $k \in \{1 \ldots K\}$ at the receive antenna $n \in \{1 \ldots n_r\}$ is $g_k(n)$. This results in a clutter free received signal $r(n)=s*g_k(n)$, where $r(n) \in \mathbb{R}^{n_t}$ is an $n_t$ dimensional time-domain measurement, and * is a convolution operator.

The scene can be partitioned into an $N_x \times N_y$ spatial grid and $x_k \in \mathbb{C}^{N_x N_y}$ can be the object response in the image domain, such that $x_k$ is zero everywhere except on the support of the object position. For a point object, we can express the impulse response as $$g_k(n) = \int_\mathbb{R} e^{i\omega t} e^{-i\omega \tau_k(n)} x_k d\omega, \qquad (1)$$

The frequency bandwidth can be discretized into $n_f$ bins, and $W_n \in \mathbb{C}^{n_f \times N_x N_y}$ can be the delay and sum operator of receive antenna n, such that $W_n(\omega,j)=e^{-i\omega \tau_j(n)/c}$ where $\tau_j(n)$ is the roundtrip time from the transmit antenna to a grid point $j \in N_x \times N_y$ and back to the receive antenna n.

For every object k, all receive antennas acquire a multipath, noisy response $m_k(n)$ as a convolution of the corresponding primary response $g_k(n)$ with an identical noise inducing delay convolutional kernel $d_k$, i.e. $m_k(n)=g_k(n)*d_k$. Consequently, the received signal at receive antenna n can be modeled as $$r(n) = s * \sum_{k=1}^{K} (g_k(n) + m_k(n)) \qquad (2)$$
$$= s * \sum_{k=1}^{K} (g_k(n) + d_k * g_k(n)),$$

where $d_k$ is independent of the location of the receive antenna n.

In this context, we estimate the delay convolutional kernels $d_k$ and the object responses $x_k$ for all objects in the scene given only the received signals $r(n)$ for all $n \in \{1, \ldots n_r\}$. Our solution is based in part on an enhancement to a Multipath Elimination by Sparse Inversion (MESI) method, see: Mansour et al., "Blind multi-path elimination by sparse inversion in through-the-wall-imaging," Proc. IEEE 5th Int. Workshop on Computational Advances in Multi-Sensor Adaptive Process, (CAMSAP), pp. 256-259, December 2013, and U.S. Patent Application 20150022390, "Method and System for Through-the-Wall Imaging using Sparse Inversion for Blind Multi-Path Elimination," Mansour, Jul. 22, 2015.

Multipath Elimination by Sparse Inversion (MESI)

The MESI method detects the objects and removes noise due to, e.g., wall clutter, by alternating between two steps:
  estimating a sparse primary object response; and
  estimating the delay convolution kernel that matches the primary object response to possible clutter in the received echoes.

Figure 3:
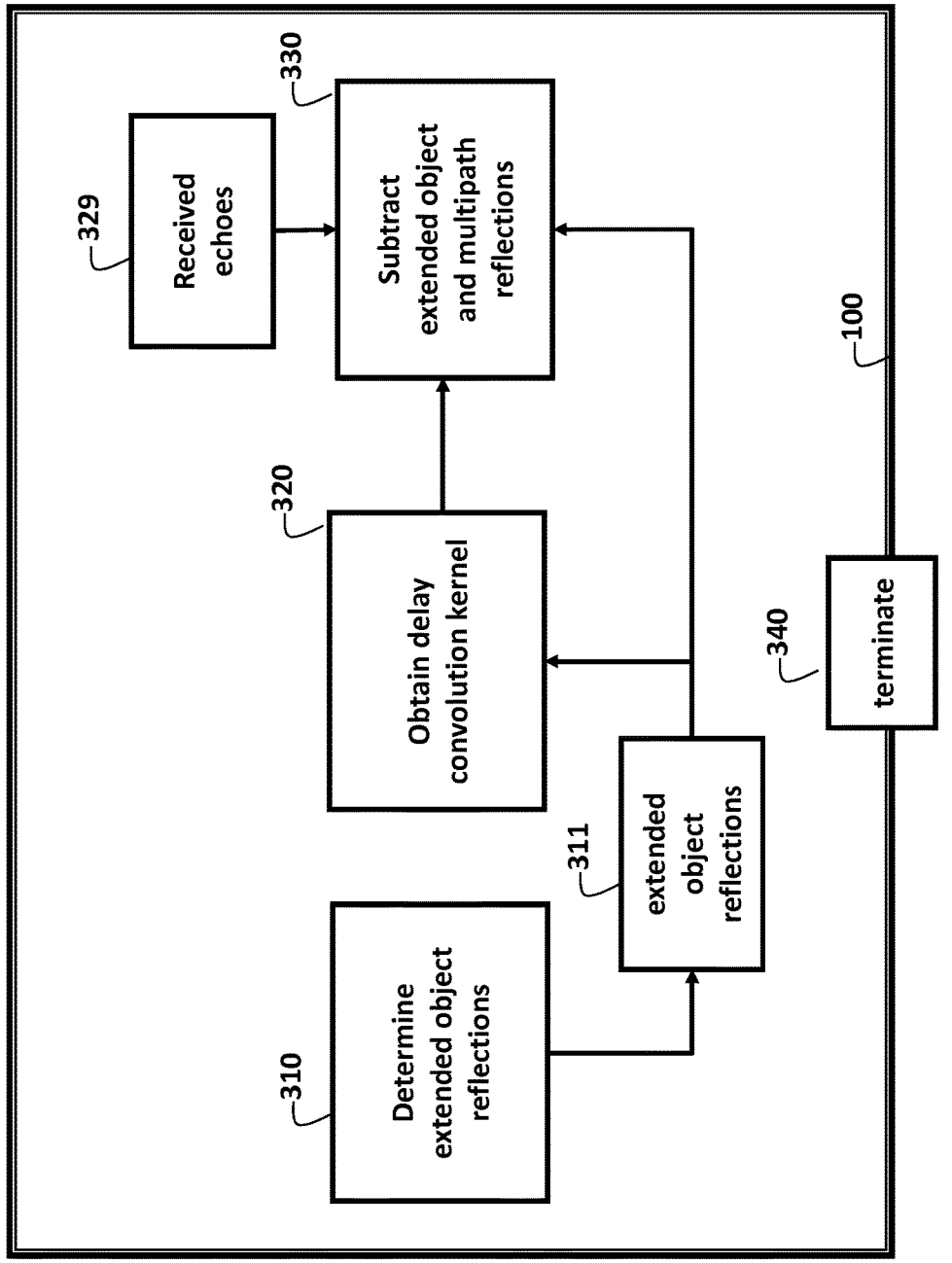
FIG. 3 is flow diagram of a MESI method according to embodiments of the invention.

The details of MESI method are shown in FIG. 3. The system includes the processor 100. The processor determines 310 separately the extended object reflection for each object, obtains 320 a delay convolution kernel that matches the extended object reflection to similar multipath reflections in the echoes, and subtracts 330 the extended object reflection and multipath reflections from the echoes 329. The steps are repeated until a termination condition 340 is reached, e.g., a predetermined number of iterations or convergence.

We denote the frequency response of a vector v by the superscripted $\hat{v}$. Given a set of measurements, the received echoes $r(n)$ 329 for all receive antennas $n \in \{1, \ldots n_r\}$ are stacked in a vector $r \in \mathbb{R}^{n_f n_r} g$, and a single transmitter multiple receiver (SIMO) imaging matrix W is formed by stacking the delay-and-sum operations $W_n$.

We define a forward model f as $$f(g_k,d_k,s):=s*(g_k+d_k*g_k), \qquad (3)$$

and let $r_x = r - \sum_{j=1}^{k-1} f(g_j,d_j,s)$ be a residual measurement at iteration k, where the $g_j$ is determined from $x_j$ using equation (1).

Then, the MESI method alternates between the two step. In the first step, the estimate of the sparse primary object response $\tilde{x}_k$ is determined by solving $$\tilde{x}_k = \underset{x}{\operatorname{argmin}} \|\hat{r}_x - \hat{s}e(Wx)\|_2 \text{ subject to } \|x\|_1 \leq \sigma_x, \qquad (4)$$

where e is an element-wise Hadamard product, and $\sigma_x$ is an appropriate sparsity bound.

In the second step, the residual measurements are updated to $r_d = r_x - s*g_k$, and the corresponding delay convolution operator that matches the primary object response is $$\tilde{d}_k = \underset{d}{\operatorname{argmin}} \|r_d - s*(d*g_k)\|_2 \text{ subject to } \|d\|_1 \leq \sigma_d, \qquad (5)$$

where $\sigma_d$ is the sparsity bound on d. The above two steps are repeated for a predetermined number iteration number, or a preset data mismatch is reached. Then, the object noise free image $\tilde{x}$ 151 is determined by summing 150 the $\tilde{x}_k$ over all iterations k.

Noise Mitigation with Total Variation

Figure 2:
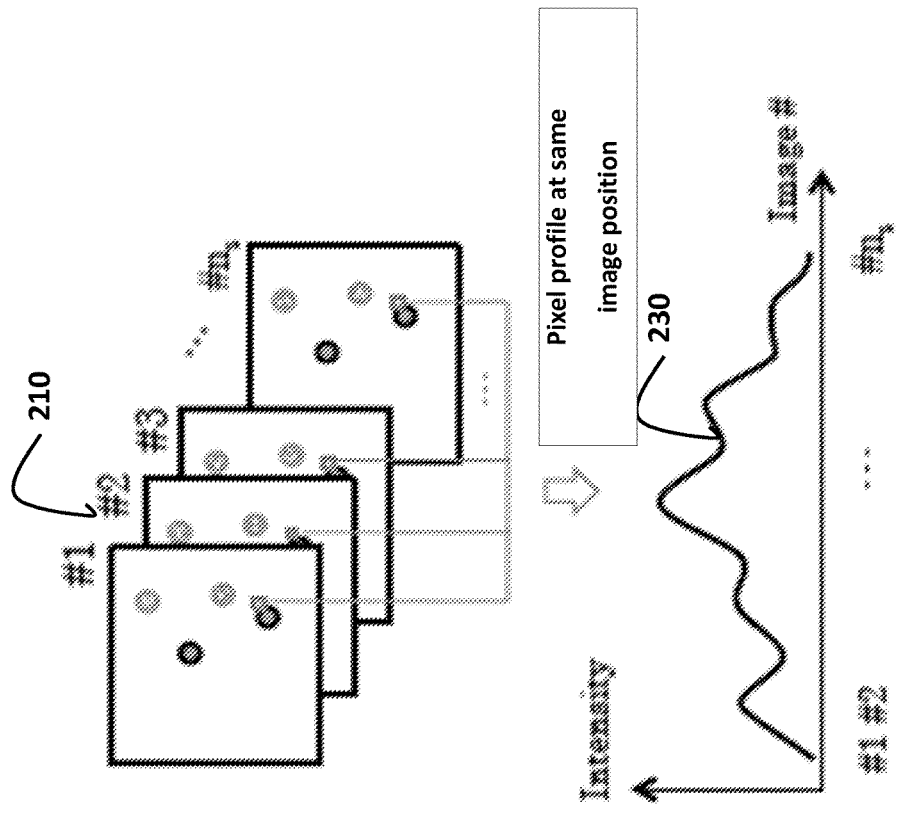
FIG. 2 is a schematic of a transmitter and stationary receivers and a profile of pixel intensities according to embodiments of the invention.
Figure 2:
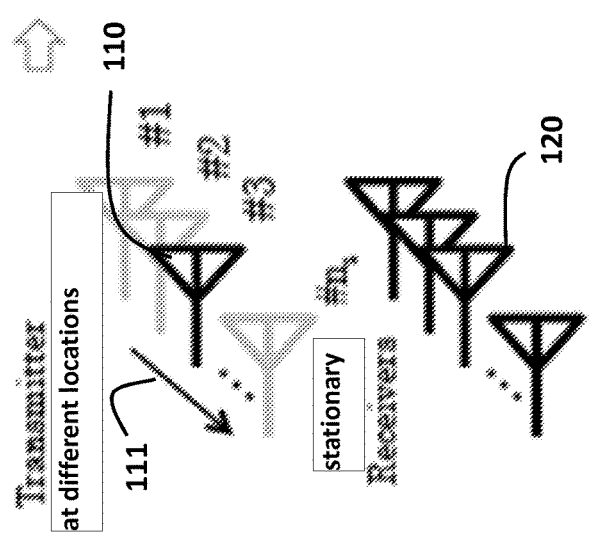

Consider the setup as shown in FIG. 2, where the locations of the transmitt antenna 110 are different to acquire several views of the scene. Specifically, we perform $n_s$ distinct measurements each corresponding to a particular location of the transmit antenna.

Observation of the scene under different arrangement of the transmit and the receive antenna pairs 210 can reduce noise in the reconstructed image. The underlying assumption is that by changing 111 the locations of the transmit antenna iteratively, the profile 230 of object reflections for the same image positions have a consistent response, whereas the reflections from indirect path have a random noise-like response.

Accordingly, we apply the total variation (TV) denoising 140 to the noisy SIMO images 131, see Rudin et al., "Nonlinear total variation based noise removal algorithms," Physica D, vol. 60, no. 1-4, pp. 259-268, November 1992. The TV is based on the principle that signals with excessive and possibly spurious detail have a larger total variation. Therefore, the TV separates pixels corresponding to objects from pixels corresponding to various types of noise.

Given the set of noisy images $\tilde{x}$ 131, we formulate the denoising as the following optimization problem $$\hat{x} = \underset{x}{\operatorname{argmin}} \left\{ \frac{1}{2} \|x - \tilde{x}\|_2^2 + \lambda TV(x) \right\}, \qquad (6)$$

where $\lambda > 0$ is a regularization parameter that controls the amount of denoising to apply. The TV can be applied during image processing to estimate signals that have piecewise-smooth profiles 230, which suits our objective of determining the profiles of objects.

Our implementation is based in part on a fast iterative shrinkage and thresholding algorithm (FISTA) that acts on the images 131, where each image corresponds to a particular transmitter location, see Beck et al., "Fast gradient-based algorithm for constrained total variation image denoising and deblurring problems," IEEE Trans. Image Process, vol. 18, no. 11, pp. 2419-2434, November 2009.

Extended Object Detection

One limitation of the conventional MESI method is that at a given iteration k the method can fail to obtain the entire object response $x_k$. Consequently, the delay convolution kernel determined at that iteration does not necessarily correspond to the actual object, which typically leads to a degradation in performance.

Accordingly, our method significantly improves the quality of the noise free image by recognizing and extracting all the pixels in noisy image corresponding to a particular object. This can be practically achieved by replacing equation (4) with a detector for the strongest reflector as $$\bar{x}_k = \underset{x}{\operatorname{argmin}} \|\hat{r}_x - \hat{s}e(Wx)\|_2 \text{ subject to } \|x\|_0 = 1. \quad (7)$$

The extended object reflection $\tilde{x}_k$ is then determined by scanning the spatial neighborhood around $\bar{x}_k$ and assigning all the connected pixels to the same object k.

Thus, our implementation compares the relative energy difference between the strongest reflector and a pixel in the neighborhood. If the relative energy is higher than a given threshold, then we accept that pixel as a part of the extended object, otherwise we discard the pixel as background.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for determining a noise free image of a scene located behind a wall, comprising:
    a transmit antenna emits a radar pulse from different locations in front of the wall, wherein the radar pulses propagate through the wall and are reflected by the scene as echoes;
    a set of stationary receive antennas acquire the echoes corresponding to each pulse transmitted from each different location;
    a radar imaging subsystem connected to the transmit antenna and the set of receive antennas determines a noisy image of the scene for each location of the transmit antenna;
    a total variation denoiser denoises each noisy image to produce a corresponding denoised image; and
    a combiner combines incoherently the denoised images to produce the noise free image.

2. The method of system 1, wherein the scene includes objects reflecting the pulses as the echoes.

3. The system of claim 1, wherein the noisy images are single-input multiple-output (SIMO) images, and the noise free image is a multiple-input multiple-output (MIMO) image.

4. The system of claim 1, wherein the combiner sums the denoised images.

5. The system of claim 1, wherein the transmit antenna is one of the set of receive antennas operating in transmit mode for each location.

6. The system of claim 1, wherein all receive antennas acquire a multipath, noisy response as a convolution of a corresponding primary response with an identical noise inducing delay convolutional kernel.

7. The system of claim 6, wherein the delay convolutional kernel is estimated using a Multipath Elimination by Sparse Inversion (MESI) method.

8. The system of claim 7, wherein the MESI method alternating between two steps comprising estimating a sparse primary object response; and estimating the delay convolution kernel that matches the primary object response.

9. The system of claim 7, wherein the MESI extracts an extended object reflection composed of all pixels in the noisy image corresponding to each object.

10. The system of claim 9, further comprising a processor, wherein the processor determines separately the extended object reflection for each object, obtains the delay convolution kernel that matches the extended object reflection to similar multipath reflections in the echoes, subtracts the extended object reflection and multipath reflections from the echoes and repeats the determining, the obtaining, and the subtracting until a termination condition is reached.

11. A method for determining a noise free image of a scene located behind a wall, comprising steps:
    emitting, using a transmit antenna at a locations in front of the wall, a radar pulse, wherein the radar pulse propagate through the wall and is reflected by the scene as echoes;
    acquiring, using a set of stationary receive antennas, the echoes corresponding to the pulse transmitted;
    determining, using a radar imaging subsystem connected to the transmit antenna and the set of receive antennas, a noisy image of the scene;
    denoising, using a total variation denoiser, the noisy image to produce a denoised image;
    repeating the emitting, the acquiring, the determining, and the denoising for different locations; and then
    combining incoherently, the denoised images to produce the noise free image.

* * * * *